Feb. 12, 1924.
D. F. DUNHAM
VALVE GRINDER
Filed March 20, 1922
1,483,721
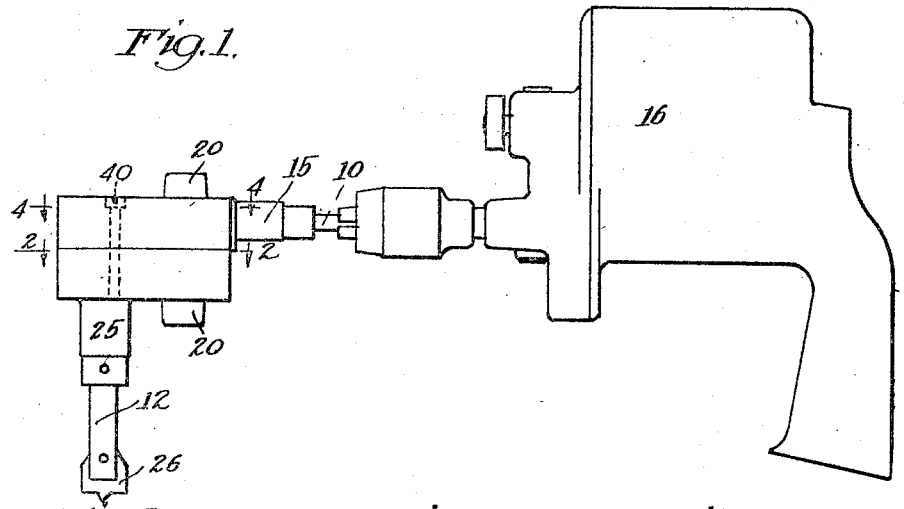
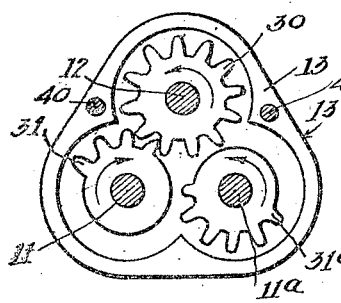
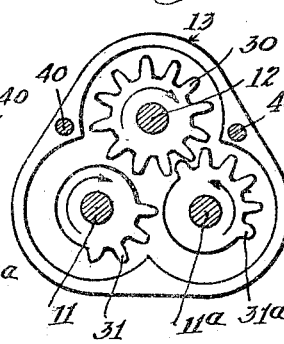
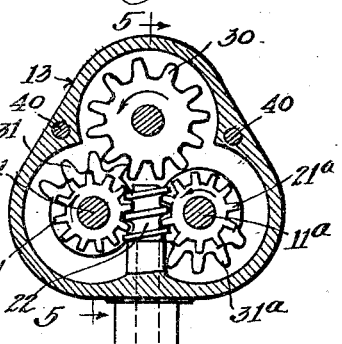
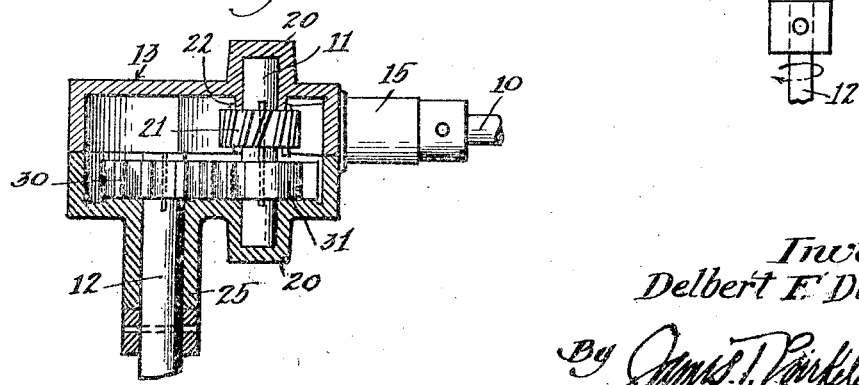
Inventor,
Delbert F. Dunham
By James I. Parkhurst
his Attorney Patented Feb. 12, 1924.

1,483,721

UNITED STATES PATENT OFFICE.

DELBERT F. DUNHAM, OF LOS ANGELES, CALIFORNIA.

VALVE GRINDER.

Application filed March 20, 1922. Serial No. 545,006.

*To all whom it may concern:*

Be it known that I, DELBERT F. DUNHAM, a citizen of the United States, residing at Los Angeles, in the county of Los Angeles and State of California, have invented certain new and useful Improvements in Valve Grinders, of which the following is a specification.

This invention has to do with a valve grinder, and it is an object of the invention to provide a simple, effective, improved device of this character.

The device provided by this invention is adapted to be used in grinding valves such as are ordinarily used in automobile engines, and the like, and it is generally, an object of the invention to provide a simple, effective mechanism which will convert constant rotary motion into an advancing oscillatory motion such as is desired in grinding in valves. The device is particularly adapted to be operated by power, say for instance by an electric drill operating mechanism, although it can be conveniently operated by a hand drill operating mechanism, or the like.

Another object of the invention is to provide a mechanism of the character specified that is simple, compact, reliable and effective. The invention can be carried out in an extremely simple mechanism which can be housed in a small neat casing and which is reliable and durable.

The various objects and features of the invention will be best and more fully understood from the following detailed description of a typical form and embodiment of the invention, throughout which reference is had to the accompanying drawings, in which:

Fig. 1 is a side elevation of the device of the present invention showing it in combination with a typical electric drill operating mechanism; Fig. 2 is a plan detail section of the device taken as indicated by line 2—2 on Fig. 1, showing the parts in one operative position; Fig. 3 is a view similar to Fig. 2 showing the parts in another operative position; Fig. 4 is a detailed plan section of the device taken as indicated by line 4—4 on Fig. 1; and Fig. 5 is a vertical detailed sectional view taken as indicated by line 5—5 on Fig. 4.

The device of the present invention comprises, generally, a drive, designated in the drawings by the numeral 10, counter shafts 11 and 11$^a$, which are driven in opposite directions by the drive shaft 10 through a suitable gear mechanism, an operating spindle 12 driven from the counter shafts 11 through a suitable gear mechanism, and a casing which carries and houses the various parts of the mechanism. The drive shaft 10 is carried in a bearing 15 formed in the casing 13 so that it is horizontal and has one end extending into the casing 13 and the other end projecting from the casing 13 to be connected with a suitable operating mechanism 16. In Fig. 1 of the drawings I illustrate a typical electric hand-drill operating mechanism connected with the shaft 10 for the purpose of driving it.

The counter shafts 11 and 11$^a$ are carried in suitable bearings in the casing 13 so that they are vertical and are spaced on opposite sides of the drive shaft 10. Although it will be obvious that various forms and arrangements of mechanims may be employed to operate the countershafts 11 and 11$^a$ in opposite directions from the drive shaft 10 I prefer to mount worm gears 21 and 21$^a$ on the counter shafts 11 and 11$^a$, respectively, at the drive shaft 10, and to mount a worm 22 on the drive shaft 10 between the worm gears 21 and 21$^a$ so that it meshes with said worm gears to operate them in opposite directions. This particular drive is simple, compact and effective, and is particularly noteworthy and desirable when the mechanism provided by the present invention is to be operated by an electric drilling mechanism or the like which operates at a rather high speed, as it may be designed to effect a considerable speed reduction between the drive shaft 10 and counter shafts 11 and 11$^a$. In the preferred construction the worm gears 21 and 21$^a$ are the same size so that the counter shafts are operated at the same speed.

The operating spindle 12 is vertically carried in a bearing 25 in the casing 13 so that it has one end extending into the casing 13 and the other end projecting from the casing 13. A suitable head 26 may be provided on the outer end of the spindle to engage the valve which is to be ground. A complete gear 30 is secured on the operating spindle 12 within the casing 13. In accordance with the present invention broken gears, or gear segments, 31 and 31$^a$ are secured on the countershafts 11 and 11$^a$, respectively, so that each of them will cooperate with the gear 30 on the operating spindle 12 to drive it a portion of a revolution. The gear segments 31 and 31ª are, of course, mounted on the counter shafts so that they engage and cooperate with the gear 30 at different times. This is necessary as one of the gear segments operates the gear 31 in one direction while the other operates it in the other direction. In accordance with the preferred form of the invention one of the gear segments is longer than the other, or has more teeth than the other, so that the gear 30 is operated further in one direction than in the other. In practice I have found it desirable to modify the shape of the teeth at the ends of the gear segments 31 and 31ª so that they will smoothly mesh with the gear 30.

The casing 13 is preferably designed so that it completely encases all of the gears and so that it will carry grease or heavy oil to keep the gears and working parts well lubricated. Further, it is preferred that the casing 13 will be made so that it can be easily machined and so that the device can be easily and conveniently assembled. In practice I have found it desirable to divide the casing 13 horizontally into two parts and to secure the parts together by suitable screws 40.

In operation the drive shaft 10 is connected with the operating mechanism, for instance, an electric hand drilling mechanism 16 such as I have illustrated in the drawings, and the head 26 at the outer end of the operating spindle 12 is arranged in engagement with the valve to be ground. Operating of the drive shaft 10 by the operating mechanism causes the counter shafts 11 and 11ª to rotate in opposite directions. This drive, as above described, is through the worm 22 and worm gears 21 and 21ª. As the counter shafts 11 and 11ª rotate the gear segments 31 and 31ª mounted on them alternately come into engagement with and rotate the gear 30. As before stated the gear segments 31 and 31ª are designed and related on the counter shaft so that they are never both in engagement with the gear 30 at the same time but are preferably such that one engages the gear 30 immediately after the other leaves it. Further, as before stated, the segments 31 are of different lengths thus causing the gear 30 to be rotated further by one than by the other. The movements of the gear 30 caused by its cooperation with the gear segments 31 and 31ª are transmitted to the valve by the operating spindle 12. The motion of the spindle, being an advancing oscillatory motion, is ideal for grinding in valves. It has been found that the particular design and arrangement of parts hereinabove described is particularly advantageous in practice in that it is compact and thus requires very little space, and in that the drive shaft 10 is horizontal thus allowing the mechanism 16, which is to operate the device to be arranged to one side of the device rather than above it as is usually necessary with devices of this character.

Having described only a preferred form of my invention I do not wish to limit myself to the details hereinabove set forth, but wish to reserve to myself any changes or variations that may appear to those skilled in the art or that may fall within the scope of the following claims.

Having described a preferred form of my invention, I claim:

1. In a device of the character described, two spaced parallel counter shafts, worm gears on said counter shafts, a drive shaft at right angles to the counter shafts, a worm on said drive shaft and arranged between said worm gears to engage them and drive them in opposite directions. a spindle parallel to the countershafts, a gear in operative connection with the spindle, and gear segments in operative connection with the counter shafts and adapted to alternately engage the gear to cause oscillatory movement of the gear.

2. In a device of the character described, a casing, two spaced vertical counter shafts carried in the casing, a horizontal drive shaft carried by the casing to have a part in the casing between the counter shafts and a part extending from the casing, worm gears secured on the counter shafts, a worm secured on the drive shaft between the worm gears to mesh with the worm gears so that the counter shafts are rotated in opposite directions by the drive shaft, a vertical spindle carried by the casing to have a part extending from the casing and adapted to operate a valve and a part within the casing, a gear secured on the spindle within the casing, and gear segments of different lengths secured on the counter shafts so that they alternately cooperatively engage the gear to cause it to progressively oscillate.

3. In a device of the character described, a casing, a vertical spindle journalled therein with parts inside and outside the casing and the exterior part adapted to engage a valve or the like, a horizontal drive shaft journalled in the casing with parts inside and outside the casing, a pair of countershafts, a gear on the drive shaft, a gear on each countershaft directly engaging the drive shaft gear to drive the countershafts in opposite directions, a gear on the spindle, and segmental gears on the countershafts to engage and rotate the spindle gear alternately in opposite directions.

In witness that I claim the foregoing I have hereunto subscribed my name this 7th day of Mar., 1922.

DELBERT F. DUNHAM.